April 12, 1966

I. A. SOFEN ETAL 3,246,325

DME WITH FAST SEARCH

Filed Sept. 25, 1963

INVENTORS:
IRVING A. SOFEN &
ROBERT P. CROW
By Floyd M. Harris
Attorney.

INVENTORS  
IRVING A. SOFEN &  
BY ROBERT P. CROW  
Floyd M. Harris  
Attorney

United States Patent Office 3,246,325
Patented Apr. 12, 1966

3,246,325
DME WITH FAST SEARCH
Irving A. Sofen, Granada Hills, and Robert P. Crow, Los Angeles, Calif., assignors to Radio Corporation of America, a corporation of Delaware
Filed Sept. 25, 1963, Ser. No. 311,445
13 Claims. (Cl. 343—7.3)

Our invention relates to improved distance measuring equipment (DME), and particularly to such equipment provided with automatic fast search in range.

DME is airborne radar equipment of the pulse type which interrogates a selected ground beacon or transponder to initiate a reply. The DME receives the reply from the beacon and gives the pilot a reading of the distance from the aircraft to the ground beacon. The DME automatically searches in range by means of a range gate, and then locks in to automatic track-in-range upon reception of the several reply pulses that are coincident in time with the range gate.

The present invention is concerned with the feature of providing a system that has an extremely fast search in range and which locks in to automatic track-in-range having a tracking rate which is very slow as compared with the extremely fast search rate. In the specific example to be described, the search rate is 40 miles per second, and the tracking rate is anywhere from 0 to 2500 miles per hour (i.e. from 0.00 to 0.07 mile per second) depending upon the speed of the aircraft carrying the DME and the relative direction of the ground station. In this example, the DME can search through the entire operating range of 200 miles in five seconds. As a result, the present invention makes it possible for the DME to lock on to a selected ground station very rapidly and give the range to that station.

It will be noted in the example given above that although the relative speed can be 0, a practical low servo system limit for continuous smooth tracking is about 36 miles per hours (i.e. from 0.00 to 0.7 mile per second) of maximum velocity (40 miles per second) to minimum velocity (0.01 mile per second) is 4000 to 1. So far as applicants are aware, a velocity ratio such as this cannot be obtained merely by changing the speed of the servo motor with previous servo systems.

As will be explained in the description which follows, when the search velocity is made very high as in the present example, best operation of the DME is obtained by providing certain operating characteristics in each mode as the DME switches through its different modes of operation, there being four modes as specified below. Such operating characteristics are, for example, the pulse repetition frequency (PRF) of the interrogating pulses, and the time constant of the discharge circuit of a capacitor which is charged in steps by reply pulses for controlling, in part, the mode switching.

As will be described later in more detail, the DME has four modes of operation which are: (1) automatic track-in-range, (2) proportional memory, (3) automatic search-in-range, and (4) acquisition. From acquisition the DME goes to automatic track-in-range, or back to automatic search (search-in-range). To explain these modes briefly, the DME is in mode 1 (automatic track) when a sufficiently strong reply signal is being received and the DME is locked in and indicating range; it is in mode 2 (proportional memory) for a period up to possibly ten seconds in response to loss or fading of the reply signals and is still indicating range; it goes into mode 3 (automatic search) if the fading or loss of reply signals lasts longer than the proportional memory period; it goes into mode 4 (acquisition) upon return of strong reply pulses, and unless they fade again promptly, it next returns to mode 1.

In a preferred embodiment of the present invention a range motor is driven by the output of a single servo channel, and the range motor drives ranging units (a distance potentiometer and a resolver, in this example) through gearing and a clutch-brake mechanism. During modes 1, 2 and 4 (see above) the clutch is made to engage so that the drive is through gears that cause the ranging units to be driven comparatively slowly by the range motor. During the search mode (mode 3) the clutch is disengaged and the brake is on so that the range motor drives through gearing having a gear ratio such that the ranging units are driven very rapidly.

As the DME switches from one mode of operation to the other, the proper signals are applied to the input of the single servo channel as will be described in detail in the following description. At this time it is sufficient to note that during automatic track-in-range (mode 1), the range error signal is applied to the servo channel input, and the clutch-brake is activated for slow drive of the ranging units; and that during automatic search-in-range (mode 3), a search voltage is applied to the servo channel input, and the clutch-brake is activated for fast drive of the ranging units.

Also, in accordance with a preferred embodiment of the invention, during the acquisition mode (mode 4) the pulse repetition frequency (PRF) of the transmitted interrogating pulses is maintained high and a short time constant is maintained for the discharge circuit of the step counter that controls, in part, the mode switching. During the track-in-range mode (mode 1) the PRF of the interrogating pulses is low, and the above-mentioned time constant is correspondingly long.

Also, in accordance with a preferred embodiment of the invention, the servo for the range motor has fast response in acquisition (mode 4) as well as in search (mode 3); and has comparatively slow response in track-in-range (mode 1).

The invention will be described in detail with reference to the accompanying drawing in which.

In the several figures like parts are indicated by similar reference characters.

The DME which will now be described is referred to as DMET (Distance Measuring Equipment Tacan). It has assigned to it 126 transmitting channels and 126 receiving channels which are frequency separated. No specific description of the apparatus providing the separate channels is required because it is known.

Figure 1:
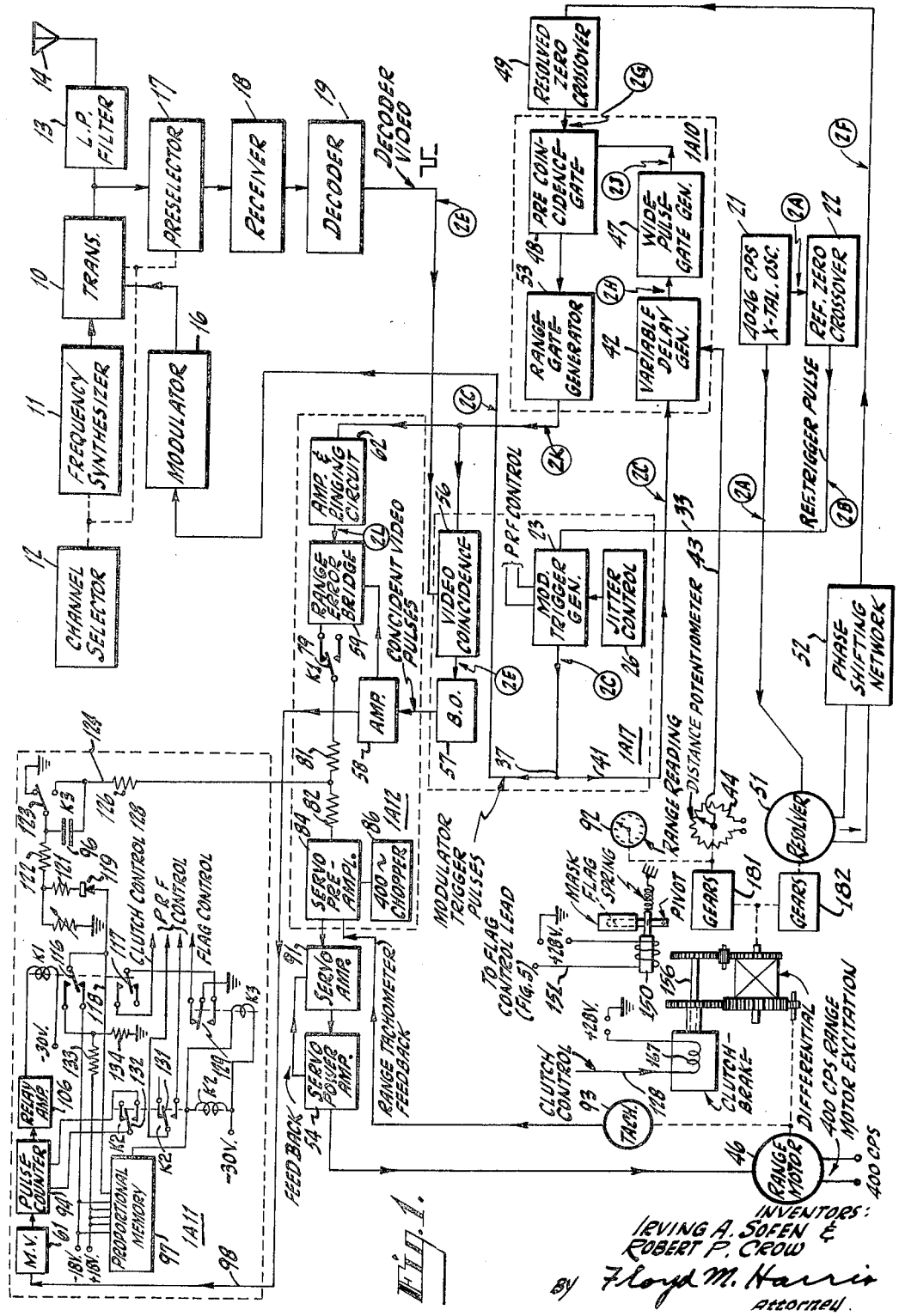
FIG. 1 is a block diagram of one embodiment of the invention.

FIG. 1 is a block diagram of a DME embodying the present invention. The DME comprises a radio transmitter 10 comprising amplifiers to which a selected carrier wave is supplied from a frequency synthesizer 11. The desired carrier wave is selected by a suitable channel selector 12. The transmitter is coupled through a low-pass filter 13 to an antenna 14 which functions as both a transmitting and a receiving antenna. The low-pass filter 13 prevents the transmission of harmonics of the transmitter frequency. It also prevents possible spurious receiver responses at frequencies, for example, where the preselector has additional pass bands. The transmitter is modulated by periodically recurring pairs of code-spaced pulses supplied from a modulator 16 for interrogating the selected ground beacon.

Reply pulses from the ground beacon are received by antenna 14 and passed through the filter 13 to a preselector 17 which is tuned to receive reply pulses on the transmitting channel of the selected ground station. As indicated by the dotted lines, when the transmitter 10 is tuned to interrogate the selected ground station, the preselector is simultaneously tuned to the transmitting frequency of that ground station. The reply signal is passed from preselector 17 to a radio receiver 18. The demodulated reply signal appears at the output of receiver 18 as periodically recurring pairs of video pulses, there being a pair of reply pulses in response to each pair of interrogating pulses. The video pulses from receiver 18 are applied to a decoder 19 which decodes the pairs of pulses to produce a single pulse for each pair of applied pulses.

*Range timing circuit*

Reference is now made to the range timing circuit which comprises, in this example, a crystal controlled oscillator 21 operating at 4046 cycles per second, and which supplies a sine wave signal 2A of constant amplitude as shown in FIG. 2A. The oscillator output is supplied to a zero crossover circuit 22 which produces one pulse at zero crossover for each applied sine wave cycle as shown in FIG. 2B. These are referred to as the reference trigger pulses 2B. The circuit 22 may be any one of several suitable types well known in the art. One such type comprises limiters for squaring the sine wave, a differentiator for producing a pulse of positive polarity at the start (zero crossover) of one half cycle of the square wave, and a blocking oscillator that is triggered by this positive pulse.

The reference trigger pulses are applied to a modulator trigger generator 23 which comprises a blocking oscillator that is triggered by the applied pulses to produce modulator trigger pulses 2C as shown in FIG. 2C. The modulator trigger pulses are passed over a lead 37 to the modulator 16. The modulator 16 includes a coding circuit for producing periodically recurring pairs of pulses, the pairs having the desired code spacing. The modulator 16 also includes a suitable pulse generator such as one of the type comprising a pulse forming delay line.

Figure 2:
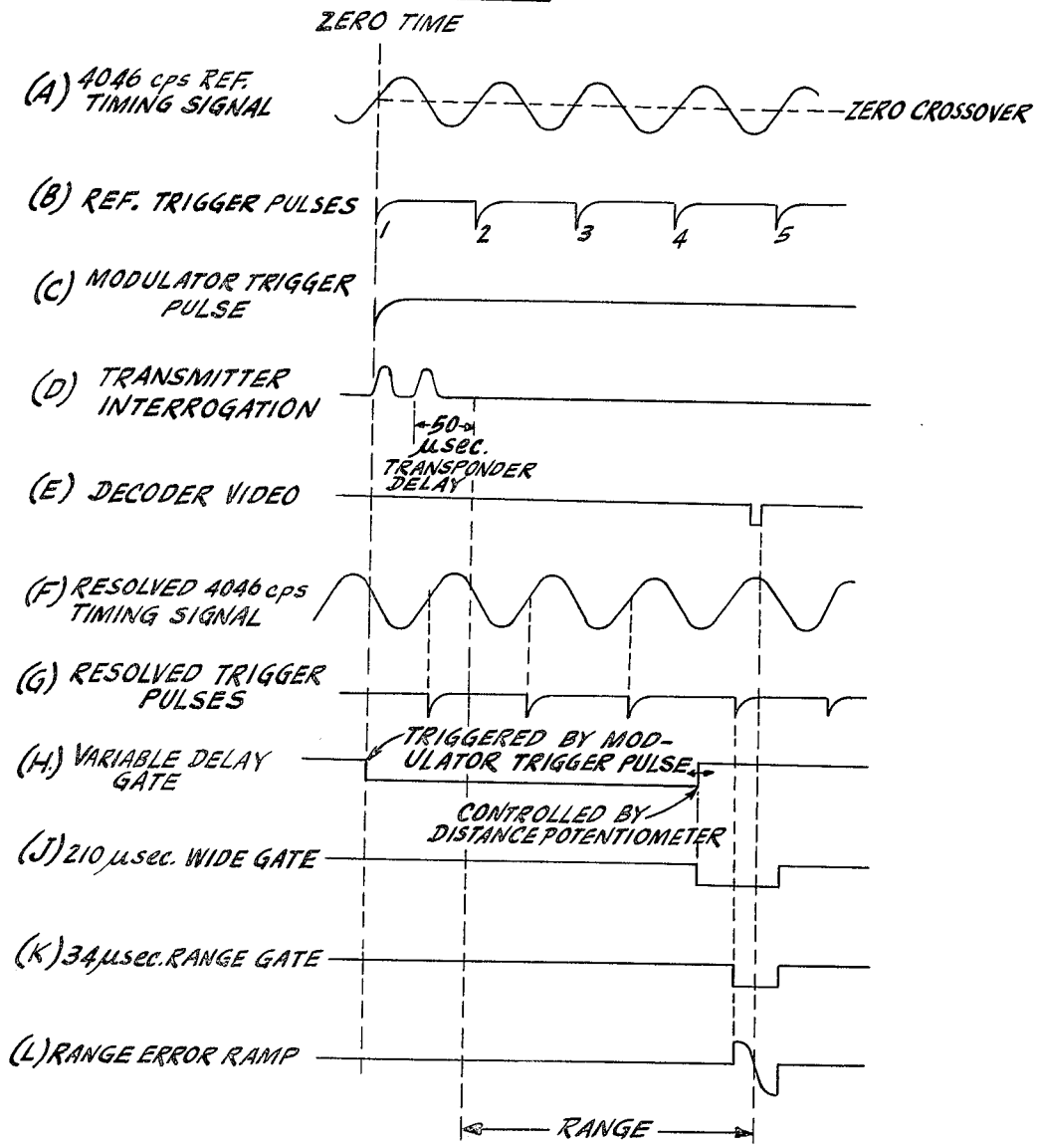
FIG. 2 is a range timing diagram for the apparatus of FIG. 1.

A jitter control circuit 26 applies a periodically varying voltage to the blocking oscillator (FIG. 3) of generator 23 so that the modulator trigger pulses jitter. This jitter is a discrete amount as will be understood by referring to FIG. 2B and FIG. 2C. In FIG. 2 the modulator trigger pulse is illustrated for the case where the blocking oscillator has been triggered by reference trigger pulse 1 of FIG. 2B. The jitter control may make the blocking oscillator fire on one of the other reference trigger pulses such as pulse 2 or pulse 3. The units 23 (modulator trigger generator) and 26 (jitter control) are included in a module 1A17, the units of which are enclosed by dotted lines.

Figure 3:
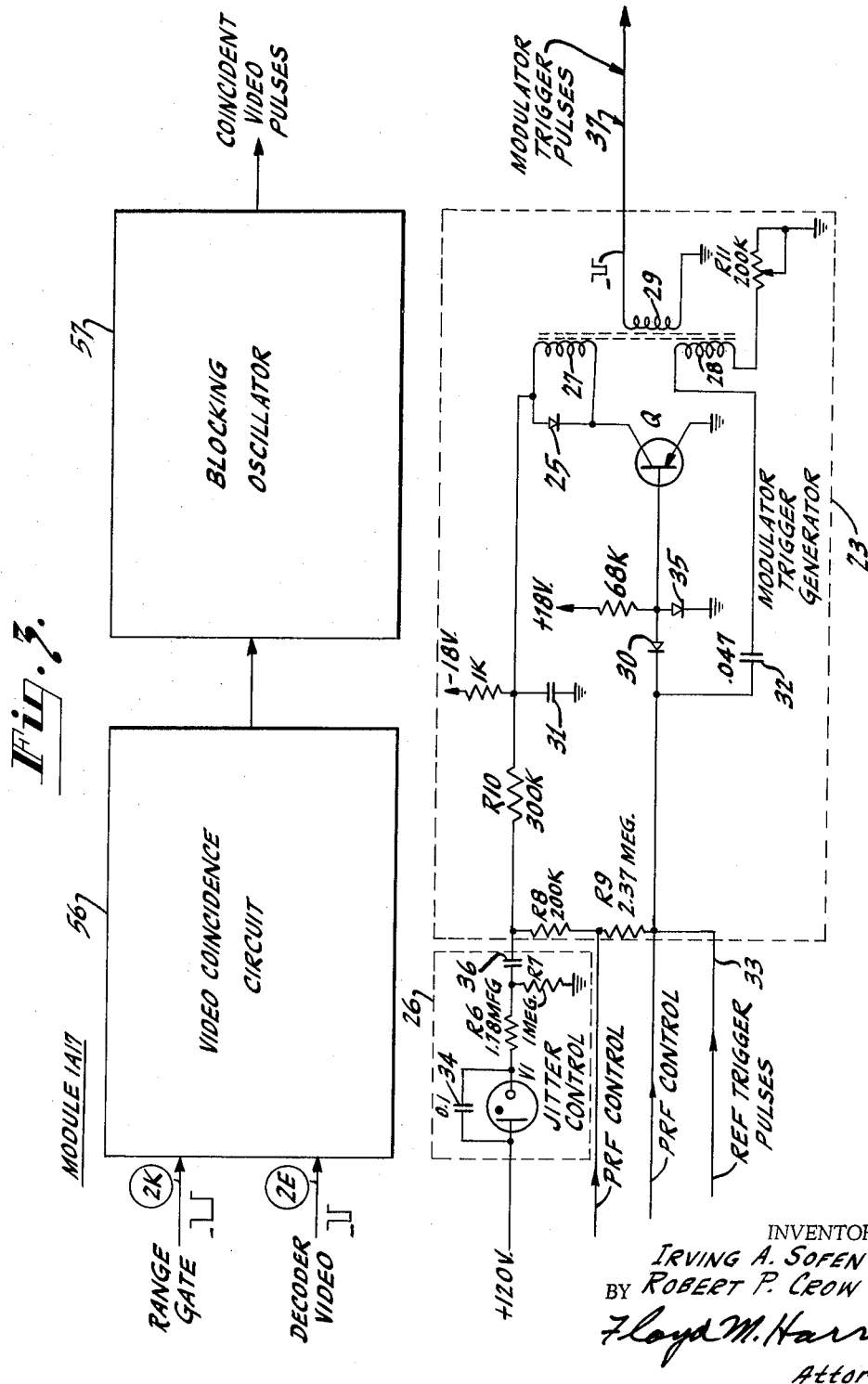
FIG. 3 is a schematic and block diagram of the module 1A17 of FIG. 1.

Now refer to FIG. 3 for certain circuit details given by way of example. The module 1A17 and circuit details of units 23 and 26 are shown in FIG. 3. The trigger generator 23 comprises a blocking oscillator which, in the example shown, comprises a transistor Q of the PNP type. The blocking oscillator transformer comprises a primary winding 27 in the collector circuit, a secondary winding 28 in the base circuit, and an output winding 29. Minus 18 volts is applied to the collector of transistor Q through a 1000 ohm resistor and primary winding 27. A filter capacitor 31 and a protective diode 25 are provided. Secondary winding 28 has one end connected through an adjustable resistor R11 to ground. The other end of secondary 28, which is driven negative when the oscillator fires, is connected through a capacitor 32 and a diode 30 to the base of transistor Q. The emitter of transistor Q is connected to ground. When the blocking oscillator fires, current flows from emitter to base, through diode 30, capacitor 32, and secondary 28 to ground. Thus, at the end of the pulse, capacitor 32 is charged and back biases diode 30. The negative reference trigger pulses being applied over lead 33 cannot trigger the blocking oscillator until sufficient charge has leaked off capacitor 32 to sufficiently reduce the back bias on diode 30.

The leakage path for capacitor 32 is through resistors R9, R8, R10, through the 1K resistor and the minus 18 volt power supply, to ground, and from ground through resistor R11 and secondary 28. The leakage rate, after initial adjustment, is determined by whether resistor R9 is shorted or remains effectively in the circuit. When shorted, the PRF is 140 pulses per second; when not shorted, the PRF is 30 pulses per second. The PRF is controlled as will be described later.

It may be noted that the blocking oscillator of trigger generator 23 is not free-running, i.e., it must be triggered since transistor Q is normally biased to cut-off by the voltage drop across a diode 35 resulting from plus 18 volts connected to its anode through a 68K resistor.

The jitter control circuit 26 is a free-running relaxation oscillator comprising a capacitor 34 connected at one side to 120 volts D.-C. and connected at the other side through resistors R6 and R7 to ground. The capacitor is shunted by a neon lamp V1 which breaks down when capacitor 34 charges to a certain voltage. Thus, a low frequency (about 10 cycles per second) sawtooth voltage appears across resistor R7. This sawtooth voltage is coupled by a capacitor 36 to the discharge path of blocking oscillator capacitor 32, thus superimposing a wave in the PRF control RC network that jitters the PRF output of the modulation trigger generator by a few counts. This jitter is a discrete amount. For example, blocking oscillator 32 may fire on reference trigger pulse 1 as shown in FIG. 2, or it may fire on reference trigger pulses 2 or 3.

The modulator trigger pulses induced in output winding 29 are applied from trigger generator 23 to the output lead 37, and over the lead 37 to the modulator 16.

*Track and search circuitry*

Reference is now made more particularly to the automatic track-in-range and automatic search-in-range circuitry. It has been stated that the modulator trigger pulses are supplied to the modulator 16. They are also supplied, referring to FIG. 1, over a lead 41 to a variable delay generator 42 which is included in a module 1A10, the units of which are enclosed by dotted lines. The unit 42 may be a phantastron or the like which produces a gate pulse having a back edge which may be varied in timing as a function of an applied D.-C. voltage. This variable delay gate pulse 2H is shown in FIG. 2H. It is triggered or started by the modulator trigger pulse 2C (FIG. 2C); it terminates at a time that is a function of the D.-C. voltage supplied over a lead 43 from the distance potentiometer 44. The potentiometer 44 is driven by the range motor 46 through a clutch-brake unit and gears as will be described in detail later.

The back edge of the variable delay pulse from generator 42 triggers a wide pulse gate generator 47 which may be a monostable multivibrator. The output of generator 47 is the 210 microsecond wide gate pulse 2J shown in FIG. 2J. This wide gate is applied to a precoincidence gate 48 for periodically gating through resolved trigger pulses 2G (shown in FIG. 2G) supplied from a zero crossover circuit 49. The precoincidence gate may be a coincidence circuit of any suitable type, such as a coincidence diode circuit.

The resolved trigger pulses 2G (FIG. 2G) are obtained as follows. The sine wave signal from timing oscillator 21 is supplied to the rotor of a resolver 51 which is driven, together with the distance potentiometer 44, by the range motor 46 through the clutch-brake unit and gears. Two out-of-phase output signals are obtained from the resolver stator windings. These output signals are supplied to a phase shifting network 52 in which they are added to produce a single phase-shifted sine wave signal, shown in FIG. 2F, which is phase shifted by an amount that is a function of the position of the resolver rotor. This signal is referred to as the resolved timing signal 2F.

The timing signal 2F is fed to the zero crossover circuit 49 which may be the same as the zero crossover circuit 22. Thus, the output of unit 49 is the resolved trigger pulses 2G (FIG. 2G).

Referring again to coincidence gate 48, the resolved trigger pulse of the pulses 2G that is coincident with the wide gate pulse 2J is passed by the gate 48. It is evident that the pulse repetition frequency (PRF) of the pulse output of gate 48 is the same as that of the modulator trigger pulses 2C.

The output pulses of gate 48 are applied to a range gate generator 53 which may be a monostable multivibrator that is triggered by the applied pulses to produce a range gate pulse 2K as shown in FIG. 2K. In the present example, the range gate pulse is 34 microseconds wide. It will now be evident that the time of occurrence of the range gate pulse 2K with respect to the modulator trigger pulse 2C is a function of the positions of the distance potentiometer 44 and the resolver 51 as set by the range motor 46.

The range motor 46 is driven by a servo power amplifier 54 which is under the control of a range error signal when the DME is in the acquisition and automatic-track-in-range modes, which is under the control of a velocity memory voltage when the DME is in the memory mode, and which is under the control of a search signal when the DME is in automatic search.

The range error signal is obtained as follows. The range gate pulses 2K are applied to a coincidence circuit 56 (part of module 1A17) which may be of the type comprising diodes. Also, the decoder video pulses 2E, shown in FIG. 2E, are supplied from the decoder 19 to coincidence circuit 56. When a decoder video pulse is in time coincidence with the range gate pulse 2K as illustrated in FIG. 2, the decoder video pulse passes through the coincidence circuit 56 and is applied to a blocking oscillator 57 (module 1A17) to trigger this oscillator so that it produces one output pulse for each applied trigger pulse 2E. These output pulses, which are 4 microseconds in width, are referred to as coincident video pulses. They are applied to an amplifier 58 (in module 1A12) which supplies the coincident video pulses as 36 volt pulses to a range error bridge 59 (also in module 1A12), and as 8 volt pulses to a multivibrator 61 in a module 1A11.

As noted above, the amplifier 58 and the bridge 59 are included in a module 1A12 as indicated by the enclosing dotted lines. This module also includes an amplifier and ringing circuit 62 which applies a range error ramp 2L, as shown in FIG. 2L, in the form of an S wave to the range error bridge 59. The ramp 2L is generated by the range gate 2K supplied from generator 53, and is time coincident with it. Therefore, the coincident video pulses will be coincident with some portion of the range ramp to produce a range error signal unless the coincidence occurs at the center or zero crossover of the ramp, in which case there is no error signal.

Figure 4:
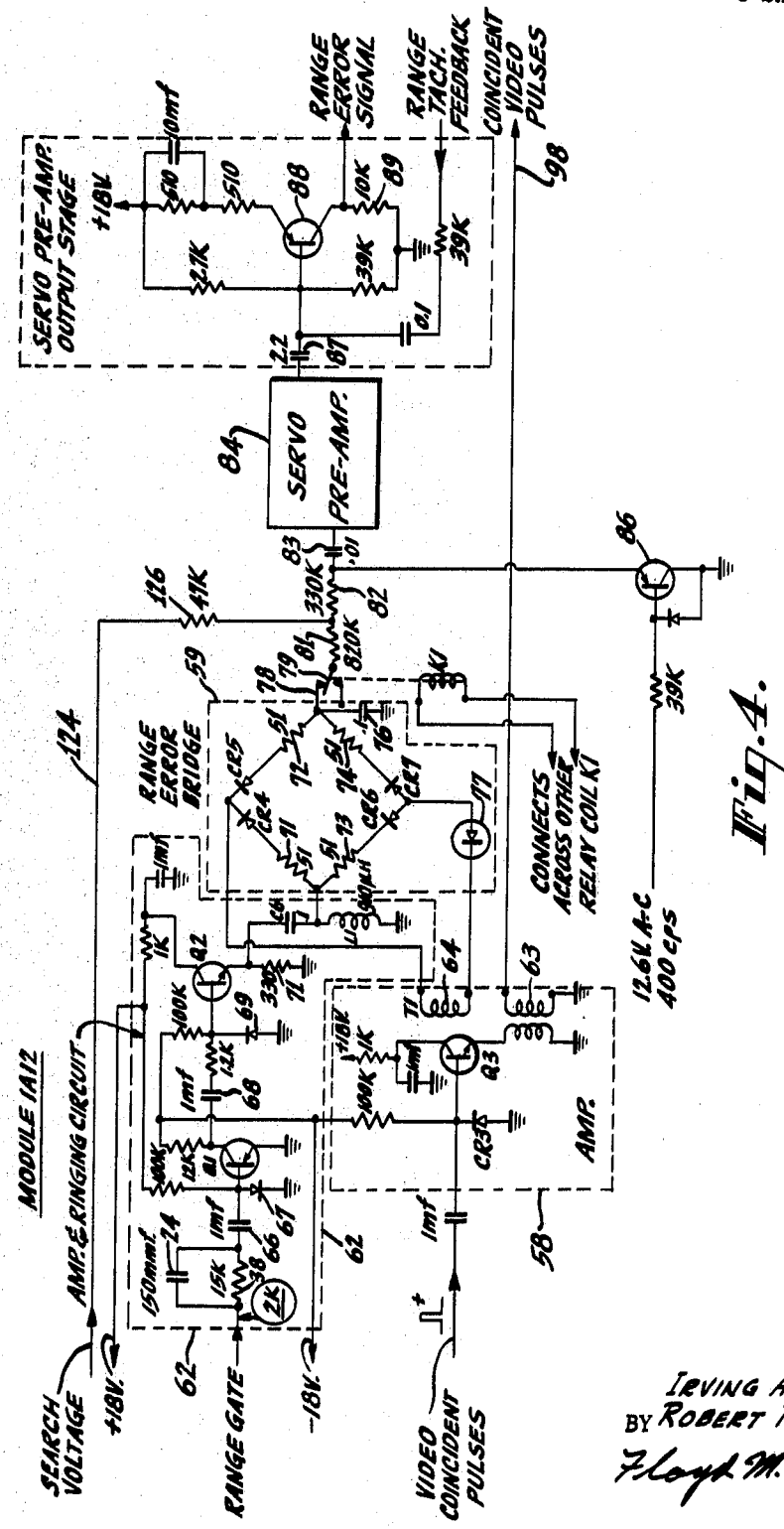
FIG. 4 is a schematic and block diagram of the module 1A12 of FIG. 1.

FIG. 4 shows units of module 1A12 in more detail merely by way of example. The amplifier 58 comprises a NPN type transistor Q3 which is normally reverse-biased by the voltage drop across a clamping diode CR3. The primary of an output transformer T1 is connected between the emitter of Q3 and ground. Transformer T1 has two secondaries 63 and 64. Upon occurrence of a coincidence video pulse, Q3 conducts to induce coincidence video pulses in the secondaries 63 and 64. The pulses from secondary 64 are applied across the range error bridge as will be described later.

The range gate 2K is applied to the amplifier and ringing circuit 62 which comprises a PNP type transistor Q1 and an NPN type transistor Q2. The range gate is applied with negative polarity through a coupling capacitor 66 to the base of Q1. Preferably, the coupling capacitor 66 is preceded by a capacitor 24 which, with the load at Q1, functions as a differentiating circuit to steepen the rise of the range gate. A resistor 38 shunts the capacitor 24 for passing the midportion of the range gate. Q1 is normally reverse-biased by the voltage drop across a clamping diode 67. During the application of the range gate, Q1 is forced into saturation thus producing a positive 18 volt pulse output at the collector of Q1. This output is applied through a coupling capacitor 68 and Q2 to the ringing circuit which comprises a capacitor C6 and an inductance coil L1. Q2 functions as an emitter-follower driving the series resonant circuit C6, L1. Q2 is normally reverse-biased by the voltage drop across a clamping diode 69.

During the period that Q2 is applying the range gate to the ringing circuit C6, L1, one cycle of a sinusoidal ramp voltage is produced by an interchange of energy between L1 and C6 to produce the range error ramp 2L. The oscillation is terminated when C6 begins to discharge, thus back-biasing Q2 sufficiently to turn it off. The discharge is then completed through the emitter output resistor 71. The ramp voltage 2L is applied across one diagonal of the range error bridge 59.

The bridge 59 has a resistor and a diode in each of its four arms, the four arms containing, respectively, resistor 71 and diode CR4, resistor 72 and diode CR5, resistor 73 and diode CR6, and resistor 74 and CR7. The ramp voltage is applied to the bridge by a connection from the high voltage end of L1 to the junction of resistors 71 and 73, and by a connection from the other end of L1 through ground and through a storage or range error capacitor 76 to the junction of resistors 72 and 74.

The video coincident pulses induced in secondary 64 are connected across the other diagonal of the bridge 59, the upper end of secondary 64 being connected to the junction point of diodes CR4 and CR5, and the lower end of secondary 64 being connected through a 24 volt Zener diode 77 to the junction point of diodes CR6 and CR7. The Zener diode 77 acts as a threshold circuit to pass only signal above a certain voltage level and thus eliminate the lower voltage noise. Also, it maintains the current flow at a constant value since the input impedance (at secondary 64) is high. During the presence of each 36 volt, 4 microsecond pulse supplied from secondary 64, all four arms of the bridge are conducting. Therefore, during this 4 microsecond interval the ramp voltage 2L (of 34 microseconds duration) is sampled to charge or discharge capacitor 76 if the sampling occurs at one side or the other of the ramp zero crossover. If the 4 microsecond video coincident pulse is time coincident with the ramp zero crossover, the charge on storage capacitor 76 remains unchanged.

From the above it will be seen that the polarity and amplitude of the voltage built up on capacitor 76 is a function of the position of the 4 microsecond video coincident pulse inside the 34 microsecond range gate. This video coincident pulse, it will be remembered, is generated in response to a ground beacon reply, and its timing corresponds to the time of receipt of said reply. Thus, if the video coincident pulse is centered on the ramp 2L (and thus centered in the range gate 2K) the timing of the range gate with respect to the time of transmission of a pair of interrogation pulses gives the desired range information. Therefore, the output voltage from capacitor 76 is used as the range error signal to control the operation of the range servo system.

The range error signal from capacitor 76 is supplied to the upper contact 78 of a relay K1, and to a relay arm 79 when it is in its upper position (K1 deenergized). From relay arm 79, the range error signal is supplied through the resistor 81 of a lag-lead circuit, described later, and through resistor 82 and a coupling capacitor 83 to a servo preamplifier 84 of high input impedance. The error signal is chopped by grounding the junction point of resistor 82 and capacitor 83 at a 400 cycle per second rate. This is done by applying a 400 cycle per second signal to the base of a transistor 86 which, when driven to conduction, connects the output of the lag-lead circuit to ground.

Amplified range error signal is applied through a blocking capacitor 87 to the base of a transistor 88 which is the output stage of the preamplifier. The range error output signal is taken off the collector output resistor 89 and supplied, as shown in FIG. 1, to a servo amplifier 91 which drives the range motor 46 through the servo push-pull power amplifier 54. The motor 46 is a conventional A.-C. operated reversible servo motor. The servo amplifiers and feedbacks are conventional. To provide servo stabilization, tachometer feedback voltage is supplied from a tachometer 93 to the servo preamplifier as indicated. This feedback is proportional to the rate of rotation of the range motor. The tachometer feedback also serves to maximize the range velocity ratio.

It will be apparent that the range motor 46 is driven in one direction or the other depending upon the polarity of the range error signal, and that it is stopped if the range error signal becomes zero. Thus, when the DME locks in on a ground beacon reply, the range gate is driven to keep it coincident in time with the reply pulse, i.e., the DME automatically tracks in range, and the angular position of the distance potentiometer shaft indicates the range which may be read off a range indicator 92 comprising, for example, a range dial and pointer.

*Mode switching*

The search-track control circuit in module 1A11 switches the DME from one mode of operation to another. As previously stated, there are four modes of operation, namely (1) automatic track, (2) proportional memory, (3) automatic search, and (4) acquisition.

Figure 5:
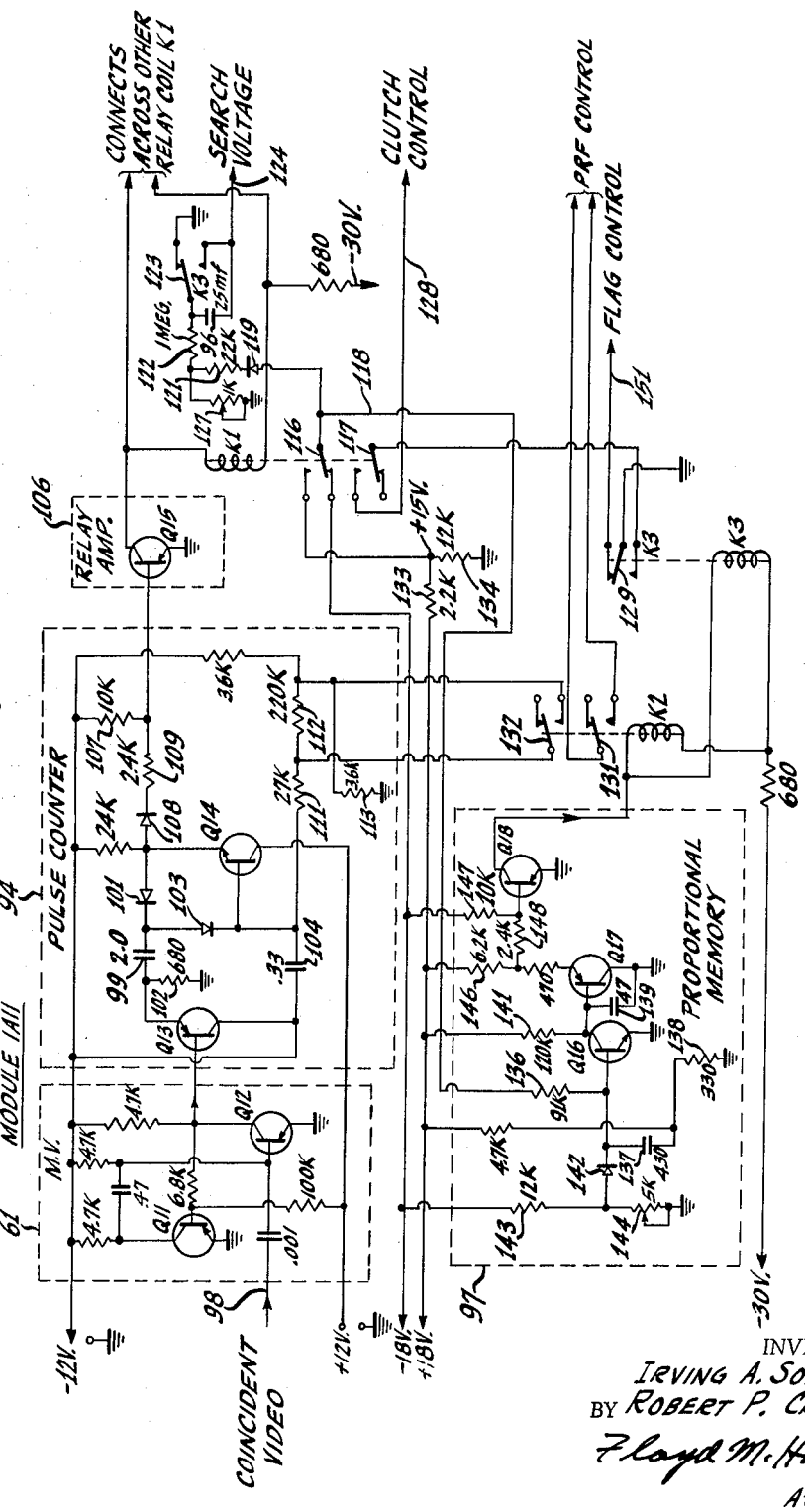
FIG. 5 is a schematic diagram of the module 1A11 of FIG. 1.

The module 1A11, referring to FIGS. 1 and 5, includes the relay K1 which is under the control of a pulse counter 94. It includes a velocity memory capacitor 96 which is also part of the lag-lead circuit. It includes a proportional memory circuit 97 which controls relays K2 and K3.

The operation and circuitry of the search-track control circuit of module 1A11 will now be described with reference to FIGS. 1 and 5. In FIG. 5, and also in FIGS. 3 and 4, some of the circuit values are given merely by way of example. Unless otherwise indicated, the values are in ohms, thousands of ohms (k.), megohms (meg.), microfarads (mf.), micro-microfarads (mmf.), and microhenries (mh.). The video coincidence pulses (which correspond to reply pulses) are supplied from the amplifier 58 of module 1A12 over a lead 98 to the multivibrator 61 of module 1A11 which is of a conventional monostable type comprising transistors Q11 and Q12. Each 8-volt 4-microsecond video coincidence pulse triggers multivibrator 61 to produce a negative 7-volt 1.5 millisecond width pulse which is applied to the base of an emitter follower transistor Q13 of the PNP type in the pulse counter 94. With Q13 conducting during the 1.5 millisecond pulse input, the Q13 emitter is driven negative and a capacitor 99 is charged through a diode 101 and the emitter of a transistor Q14 of the NPN type. This charge path is from plus 12 volts applied to the collector of Q14, through Q14, diode 101, capacitor 99, output resistor 102 and Q13. During this time a diode 103 remains reverse biased.

As soon as Q13 turns off and its emitter returns to ground potential, diode 101 becomes reverse biased and diode 103 becomes forward biased. This allows a portion of the charge stored by capacitor 99 to be transferred to a storage capacitor 104. This charge transfer path is from the positive side of capacitor 99, through diode 103, through storage capacitor 104 to the minus 12 volt supply applied to the collector of Q13, through the minus 12 volt supply to ground, and from ground through the output resistor 102 to the other side of capacitor 99.

Each successive coincident video pulse turns Q13 on and allows additional charge to be transferred from capacitor 99 to storage capacitor 104 after Q13 turns off. Thus, the voltage across capacitor 104 builds up in steps, one step for each coincident video pulse. The voltage buildup across capacitor 104 raises the base potential of Q14, and Q14 is forced to conduct harder. The receipt by the DME of three or four good amplitude ground beacon reply signals out of nine or ten in succession will raise the voltage of storage capacitor 104 to a value which drives the emitter of Q14 positive enough to deenergize the relay K1. This action takes place as follows. The relay coil of K1 normally has collector current flowing through it from a PNP type transistor Q15 comprising relay amplifier 106, Q15 being forward biased by the minus 12 volt supply applied through a resistor 107. When Q14 conducts hard enough, its emitter becomes sufficiently positive to make a diode 108 conduct, thus applying positive voltage to the base of Q15 and turning off Q15 to deenergize K1. It will be noted that diode 108 is back biased by the minus 12 volt supply applied through the 24K. resistor so that it normally is nonconducting.

Considering further the operation of pulse counter 94, the rate of voltage buildup on storage capacitor 104, and thus the potential buildup on the base of Q14, is controlled by the amount of resistance in the discharge path of capacitor 104. This discharge path is from the plus side of capacitor 104 through resistors 111, 112 and 113 to ground, and from ground through the minus 12 volt power supply back to the negative side of capacitor 104. The RC time constant of the discharge path is made shorter during the search mode by shorting the resistor 112 through contacts of relay K2 as described later.

Consider now certain functions performed by relay K1, again referring to FIGS. 1 and 5. In these figures, and in FIG. 4, the relay K1 is illustrated as deenergized; relays K2 and K3 are also shown deenergized; and the DME is in the automatic track-in-range mode. It will be noted that the two K1 relay coils shown in FIGS. 4 and 5, respectively, are connected in parallel, the K1 coil in FIG. 4 controlling relay arm 79. With K1 deenergized, range error signal is applied through arm 79 to the servo preamplifier 84, and the DME is tracking in range.

As shown in FIGS. 1 and 5, with K1 deenergized its arms 116 and 117 are in their lower position where 117 connects to an open circuit and arm 116 connects to a minus 18 volt supply. This 18 volts is now connected through a lead 118 to the proportional memory circuit 97 as will be discussed later. For applying a search voltage to the servo preamplifier 84 when K1 is energized, the relay arm 116 is also connected through a diode 119, resistors 121 and 122 to the relay arm 123 of relay K3. This arm connects to ground when K3 is deenergized, as in the illustrated track mode, and connects to a lead 124 when K3 is energized, thus applying a search voltage to lead 124, and also shorting velocity memory capacitor 96. The level of the search voltage is controlled by a variable resistor 127 which together with resistor 121 acts as a voltage divider. The search voltage is supplied, during the search mode, over lead 124 and, referring to FIGS. 1 and 4, through a resistor 126 to the junction point of resistor 81 of the lag-lead network and resistor 82. The lag-lead network comprises resistors 81, 126 and capacitor 96.

During the track mode the velocity memory capacitor 96 is charged by the range error voltage supplied from the range error capacitor 76 (FIG. 4). This error signal is fed through resistors 81 and 126, lead 124 to velocity memory capacitor 96, and through relay arm 123 to ground. As a part of the lag-lead network capacitor 96 stores the time integral of range error. The greater the velocity of the airborne DME with respect to a ground station, the greater the range error voltage, and the greater the charging voltage applied to the velocity memory capacitor 96.

It should now be noted that the complete lag-lead network consists of the resistors 81 and 126 (FIG. 4) and the velocity memory capacitor 96 (FIG. 5), capacitor 96 actually performing two functions. The lag-lead network when in the circuit causes the servo to have a comparatively slow response, and be non-responsive to noise. The servo response is fast when capacitor 96 is shorted by relay arm 123 with greater acceleration capability; it is comparatively slow when capacitor 96 is not shorted.

As previously mentioned, the range gate is driven comparatively fast for search and comparatively slow for track as determined by the clutch-brake unit and gearing mechanism. This slow or fast drive is under the control of relay K1 in cooperation with relay K3 as indicated in FIGS. 1 and 5. The clutch-brake unit, in effect, shifts gears for fast or slow drive, the set of gears through which the range motor 46 is driving depending upon whether a clutch control lead 128 is grounded or ungrounded as described in detail later. With DME in the track mode, K1, K2 and K3 being deenergized as illustrated, arm 117 of K1 is disconnected from clutch control lead 128 and the lead is ungrounded. Thus, the range motor 46 is driving the distance potentiometer 44 and resolver 51 through the slow driving gear train.

When K1 is energized, as in the search mode, and providing K3 is energized, as it is in the search mode, the clutch control lead 128 is connected to ground by way of K1 arm 117 and the arm 129 of relay K3. Thus, the clutch has been actuated so that the range motor 46 is now driving through the fast driving gear train.

From the foregoing it will be noted that relay K3 functions for clutch-brake control by action of its arm 129, and that it also functions at the velocity memory capacitor 96 by action of its arm 123 for either shorting the memory capacitor or connecting its upper side to ground. Both relay K3 and relay K2 are controlled by the proportional memory circuit 97. Relay K2 performs two functions. The position of its arm 131 determines the pulse repetition frequency (PRF) of the transmitted interrogation pulses, the PRF being higher during the search mode than during the track mode; and the position of its arm 132 determines whether or not resistor 112 of pulse counter 94 is shorted. Resistor 112 is shorted during the search mode when the PRF is high so that the discharge circuit of storage capacitor 104 has a shorter time constant. During the track mode, when the PRF is comparatively low, the resistor 112 is not shorted.

The proportional memory circuit 97 will now be described. Its main function is to make the duration of the memory mode proportional to the length of time that the DME has been in the track mode. In the absence of proportional memory, any time that the DME went into the memory mode it would stay in that mode for some fixed period such as ten seconds. Thus, in this example, there would always be an interval of ten seconds before the DME could go into the search mode. With proportional memory the DME will remain in the memory mode for only a short interval, such as two or three seconds, if the DME has been in the track mode for only a short interval. If it has been in the track mode for a comparatively long period and then goes into the memory mode, it will stay in the memory mode for the maximum period which, in the present example is about ten seconds.

It will be seen that the driving of the servo by the velocity memory capacitor 96 is terminated as soon as the K3 relay arm 123 shorts capacitor 96 and connects the search voltage to the lead 124. At this point it may be noted that the search voltage is plus 15 volts taken from the junction point of voltage divider resistors 133 and 134 when the K1 relay arm 116 is in its upper (energized) position.

Upon fading or loss of the ground station reply signals, the DME goes from the track-in-range mode to the memory mode as a result of relay K1 being energized. During the memory mode the relays K2 and K3 remain de-energized, the condition shown in FIGS. 1 and 5. Thus, at the start of the memory mode, K1 arm 116 is in the up position applying plus 15 volts to lead 118, and K1 arm 79 (FIG. 4) is down to disconnect the servo from the range error signal. The servo is now being driven by the voltage built up on velocity memory capacitor 96 during the track mode.

Consider now the action of the proportional memory circuit 97 during the two modes preceding the memory mode, namely, the track mode and the acquisition mode (which precedes the track mode). In these two modes the relay K1 is deenergized, its arms being in the position illustrated. Therefore, during these two modes K1 arm 116 is connected to minus 18 volts which is applied over lead 118, through a resistor 136 to the high capacity proportional memory capacitor 137, and from capacitor 137 through a 4.7K resistor to plus 18 volts. It will be noted that the charging circuit for capacitor 137 has a long time constant, the capacity of 137 being 430 microfarads. It is evident that the longer the DME is in the track mode, the greater the charge acquired by capacitor 137.

As soon as the relay K1 is deenergized (i.e. at the start of the acquistion mode) the capacitor 137 starts to charge negatively. In a fraction of a second capacitor 137 charges negatively enough to turn off a transistor Q16 of the NPN type. This permits an acquistion control capacitor 139 to be charged positively from the plus 18 volt supply through the collector resistor 141 of Q16, capacitor 139 being between the base and grounded collector of a PNP type transistor Q17.

In about 0.75 second capacitor 139 charges positively enough to turn off the transistor Q17. This results in the turning off of a PNP type transistor Q18. Thus, the relays K2 and K3 are de-energized since they receive their energizing current from the collector of Q18. This interval of about 0.75 second is the acquisition mode period. As soon as relays K2 and K3 are de-energized, the acquisition mode has terminated and the DME is in the track mode. It should be noted that during the acquisition mode period the relays K2 and K3 are energized so that the PRF of the interrogation pulses is high and the time constant of the discharge path for the step-charged capacitor 104 is short.

Referring again to the charging of the proportional memory capacitor 137, this capacitor will continue to charge negatively until its voltage is clamped by a diode 142 at a level determined by a voltage divider comprising resistors 143 and 144 connected between minus 18 volts and ground. Approximately ten seconds are required to reach the clamp voltage. If the DME is in track (and acquisition) for less than ten seconds, the clamp voltage is not reached.

Now consider the proportional memory operation when reply signals are lost so that relay K1 is energized, and the DME goes into the memory mode. The relays K2 and K3 remain de-energized during the memory mode, and are energized at the end of the memory mode as will now be described. With K1 energized, its arm 116 is in the upper position applying plus 15 volts through the lead 118 and resistor 136 to proportional memory capacitor 137. Capacitor 137 is now charged in the opposite direction at approximately the same rate as before. After a period approximately equal to the original charging time (for the negative charging) of capacitor 137, the transistor Q16 is forward biased and conducts. This period is a maximum of about ten seconds, and is a shorter period if the DME is in the track mode for a shorter period. The forward biasing of Q16 energizes relays K2 and K3, the K3 arm shorting the velocity memory capacitor 96, thus ending the memory mode. The energizing of relays K2 and K3 occurs when Q16 is forward biased since conduction of Q16 drives Q17 into conduction. By virtue of Q17 conducting, the voltage divider network 146, 147, 148 places a negative potential at the base of Q18 which turns it on and energizes relays K2 and K3 ending the memory mode. It is evident that the duration of the memory mode is proportional to the length of time the DME is in the track mode, up to a maximum of about ten seconds. Therefore, the DME is allowed to go into the search mode fairly promptly if it has been in the track mode for only a few seconds, such as three or four seconds.

At the end of the memory mode the three relays K1, K2 and K3 are energized and the DME is in the search mode with the search voltage being applied to the lead 124 and thus to the servo preamplifier 84 through diode 119, resistors 121 and 122, and K3 arm 123; the resistor 112 of the pulse counter is shorted; and K2 arm 131 has shorted R9 of the blocking oscillator (FIG. 3) so the PRF is high. Also, K1 arm 117 and K3 arm 129 have grounded the clutch control lead so that the range gate is being driven fast from 0 to 200 miles to locate the ground station reply signal.

When the range gate finds the reply signal (becomes time coincident with it), if three or four reply pulses out of nine or ten successive pulses, for example, get through the range gate, the pulse counter de-energizes K1 and the DME is in the acquisition mode. The range error signal is now being applied to the servo preamplifier 84 (FIG. 4), ground has been taken off the clutch control lead so that there is now slow servo drive of the range gate, and the lead 118 (FIG. 5) now applies minus 18 volts to the proportional memory capacitor 137 and to the base of Q16 resulting, after about 0.75 second, in the de-energizing of K2 and K3 as previously explained. The system is now in the track mode.

As shown in FIG. 1, there is a warning flag associated with the range indicator 92. The flag is masked and not visible when the range indicator is presenting a correct range reading as is the case when the DME is in the track mode. When the DME is in search, for example, the flag is pulled from behind the mask by a spring so that an operator is warned that the range indication is not correct.

During the track mode the warning flag is held behind the mask by an energized solenoid 150. The solenoid is energized when a lead 151 is grounded, as it is when the relay K3 (FIG. 5) is deenergized so that the relay arm 129 is in the upper position. This is the condition illustrated, the DME being illustrated as being in the track mode.

The sequence of operation of the DME through its four modes of operation will now be summarized.

I. TRACK MODE

Relays K1, K2 and K3 are deenergized.

The range error signal is being applied to the servo input so that the range motor is driving the distance potentiometer and the resolver to hold the range gate (and the range error ramp) substantially centered with respect to the ground station reply signal so that there is automatic track-in-range.

The DME is in slow servo drive (clutch control lead 128 being ungrounded), and the servo has slow response (capacitor 96 being in the lag-lead network).

The PRF is 30 pulses per second, and the time constant is correspondingly long for the discharge circuit of the step-charged capacitor 104 in pulse counter circuit 94 so that capacitor 104 will hold a charge longer whereby there is less tendency for relay K1 to be momentarily energized.

Meanwhile a velocity memory voltage builds up on velocity memory capacitor 96.

Also, a negative charge is building up on proportional memory capacitor 137.

II. PROPORTIONAL MEMORY MODE

Relay K1 is energized. Relays K2 and K3 remain deenergized.

Upon loss of reply signals, step-charged capacitor 104 of pulse counter 94 loses its charge, K1 is energized, and the DME goes into the proportional memory mode. The duration of this mode is proportional to the time the DME has been in track, and has a maximum period of about ten seconds.

During proportional memory the voltage of velocity memory capacitor 96 is applied to the input of the servo preamplifier so that the range gate will continue to move in range at the aircraft's last velocity.

The DME is still in slow servo drive, and the servo still has slow response.

The PRF is still 30 pulses per second, and there is still a long time constant for the discharge circuit of the step-charged capacitor 104.

If, while the DME is still in the memory mode, the reply pulses return reliably enough so that three or four reply pulses out of ten interrogation pulses pass through the range gate, the DME returns to the track mode.

If the reply pulses do not return soon enough, the DME goes into the search mode. It will be about ten seconds before the DME goes into search if the DME has been in track for ten seconds or more. However, the DME will go into search in a shorter time if it has been in track for less than ten seconds. For example, if the DME has been in track for only about four seconds when reply signals are lost, the DME will be in the memory mode for only about four seconds, and will then go into search.

As previously explained, when the DME goes into the memory mode, the deenergizing of K1 connects lead 118 to plus 15 volts, thus starting the discharge of proportional memory capacitor 137. When capacitor 137 discharges to a certain voltage, relays K2 and K3 are energized as previously explained, and the memory mode is terminated. The DME is now in the search mode.

III. SEARCH MODE

Relays K1, K2 and K3 are energized.

K3 relay arm 123 has now shorted memory (and lag-lead) capacitor 96, and has connected the D.-C. search voltage through lead 124 to the input of the servo preamplifier 84.

The DME is now in fast servo drive (clutch control lead 128 being grounded), and the servo has fast response (capacitor 96 being shorted).

The PRF of the interrogating pulses is now 140 pulses per second, and the time constant for the discharge circuit of the step-charged capacitor 104 is correspondingly short, resistor 112 having been shorted.

The range motor is now driving the distance potentiometer and the resolver so that the range gate is being swept rapidly through the 200 mile range.

When the range gate occurs at the same time as the reception of reply pulses, and if at least three or four reply pulses out of nine or ten successive pulses pass through the range gate, the step-charged capacitor 104 of pulse counter 94 is charged to a voltage that causes K1 to be deenergized. Relays K2 and K3 remain energized. The DME is now in the acquisition mode.

IV. ACQUISITION MODE

Relay K1 is deenergized. Relays K2 and K3 are energized.

The duration of this mode is about 0.75 second.

Range error signal now is being applied to the input of the servo preamplifier.

The DME is now in slow servo drive (clutch control lead 128 now being ungrounded), but still has fast servo response since memory and lag-lead capacitor 96 is still shorted.

The PRF is still 140 pulses per second, and there is still the correspondingly short discharge time constant for the step-charged capacitor 104.

If at least three or four reply pulses out of nine or ten interrogation pulses continue to pass through the range gate for the duration of the acquisition mode, the relays K2 and K3 are deenergized at the end of the acquisition mode, and the DME has returned to the track mode.

If less than these three or four reply pulses pass through the range gate during the acquisition mode, the relay K1 is energized, and the DME goes back into the search mode. This switching back into search occurs promptly because of the short discharge time constant of step-charged capacitor 104, resistor 112 being shorted.

By maintaining, during the acquisition mode, a high PRF for the interrogation pulses and a short discharge time constant for the step-charged capacitor 104, the duration of the acquisition mode can be made very short (0.75 second in this example) and still have an acquisition mode that is long enough to insure that the DME is not thrown into track by random pulse pairs that are being continuously transmitted from the ground station, these being referred to as "squitter" pulses. The use of a low PRF, such as a PRF of 30, would require an acquisition mode period of about four seconds to provide equally good insurance against squitter pulses throwing the DME into track. Furthermore, with the high PRF and short discharge time constant, the reception of squitter pulses usually deenergizes the relay K1 for only a very short interval, such as one-tenth second. This is a much shorter interval than it would be if the PRF were low with a long discharge time constant. The result is that by the use of the high PRF and short discharge time constant during the acquisition period, the ME is promptly thrown back into the search mode following reception of squitter pulses that are coincident with the range gate. Thus, the DME searches quickly and locks on to the actual reply pulses without the search process being continually interrupted for intervals that would add up to a very substantial time.

During the acquisition mode the servo has fast response since the lag-lead capacitor 96 is shorted during this mode. It will be remembered that when the DME goes into the acquisition mode, the range error signal is applied to the servo input circuit. The fast servo response provides improved operation because the range error ramp will quickly be moved to a position where it is centered with respect to the reply signal so that when the DME is switched into the track mode the range reading immediately will be the correct reading. The rapid positioning of the range gate in the acquisition mode requires a range servo acceleration capability and fast response not required, or desired during the track and memory mode.

*Clutch-brake drive*

In the example illustrated, the range motor 46 (FIG. 1) drives the distance potentiometer 44 and the resolver 51 through a clutch-brake and gear drive as previously described. This drive is shown in more detail in FIGS. 6 and 7. First referring to the clutch-brake unit, it comprises a rotatable shaft 156 to which is attached a clutch plate 157 and a brake plate 158. The shaft 156 extends through and is rotatably supported by a coaxial shaft 159. Shaft 159 is rotatably supported by the end of a metal housing 161.

One end of the shaft 159 carries a clutch plate 162 which faces the clutch plate 157. The other end of the shaft 159 has a gear wheel 165 attached thereto which is driven by the range motor 46 through gear wheels 163 and 164. The gear 164 has the same number of teeth as the gear 165.

Figure 6:
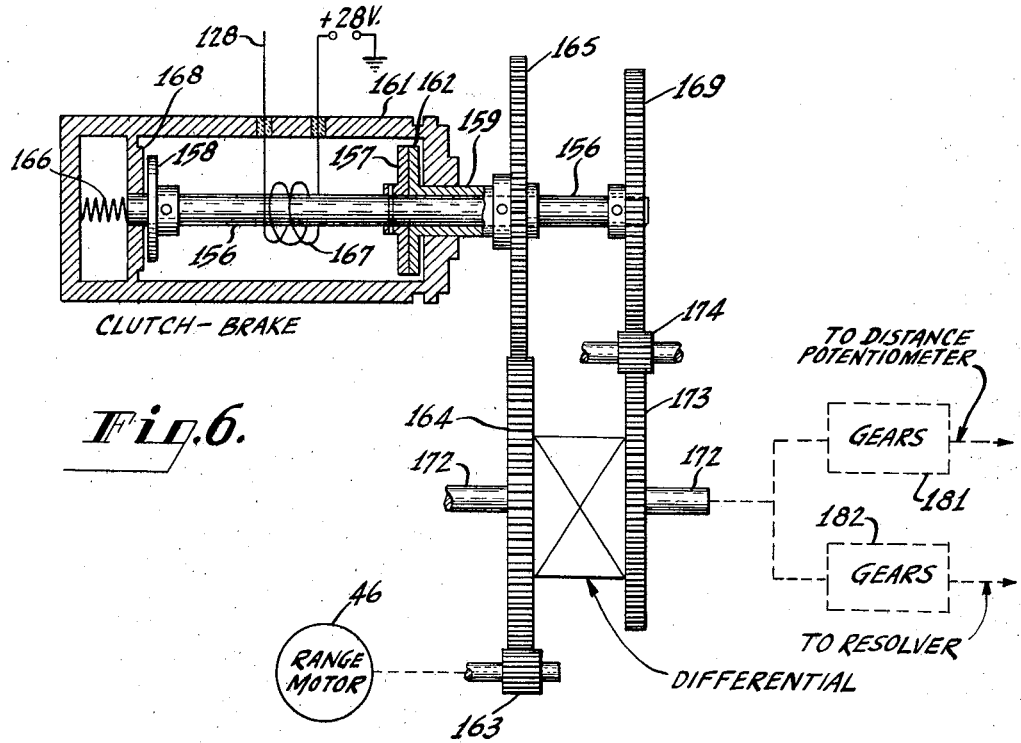
FIG. 6 is a schematic diagram of the clutch-brake and gearing through which the range motor (FIG. 1) drives the ranging units.

As illustrated in FIG. 6, the clutch is engaged due to the action of a spring 166 which forces the shaft 156 to the right, and thus causes the clutch plate 157 to engage the clutch plate 162.

In response to the energizing of a solenoid, indicated schematically by the coil 167, the shaft 156 is pulled to the left, thereby disengaging the clutch 157–162 and stopping the shaft rotation quickly by forcing the brake plate 158 against a brake plate 168 which is attached to the housing 161. It will be seen that when the solenoid 167 is deenergized (the clutch engaged), the range motor 46 drives the shaft 156 and a gear wheel 169 attached thereto; and that when the solenoid 167 is energized, the clutch is disengaged and the brake is applied so that the rotation of the shaft 156 is quickly stopped.

Figure 7:
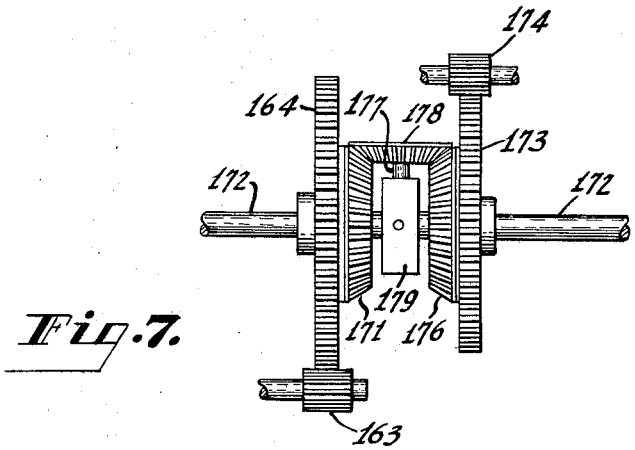
FIG. 7 is a schematic diagram illustrating the differential unit incorporated in the gearing shown in FIG. 6.

As shown in FIG. 7, the gear wheel 164 is fastened to the bevel gear 171 of a differential. The gears 164 and 171 are rotatable about a differential shaft 172. A gear wheel 173 is driven through an idler gear 174 by the gear wheel 169 (FIG. 6). The gear 173 has a different number of teeth than the gear 169. In the example described it is a difference of one tooth, the gear 173 having 61 teeth and the gear 169 having 60 teeth. The gear 173 is fastened to the bevel gear 176 of the differential, and both gears are rotatable about the differential shaft 172.

The bevel gears 171 and 176 mesh with a bevel gear 178 which is rotatable about a supporting shaft 177. The shaft 177 is mounted on a supporting block 179 which is fastened to the differential shaft 172.

It will be apparent that, in operation, if the gear wheel 173 is held stationary (the brake on) while the gear wheel 164 is being driven, the bevel gear 171 will drive the bevel gear 178 around the bevel gear 176 and rotate the shaft 172 at a comparatively fast rotation.

Comparatively slow rotation of the shaft 172 is obtained when the clutch is engaged so that both the gear 173 and the gear 164 are rotating (and bevel gears 176 gear 174, the gears 173 and 164 (and bevel gears 176 and 171) rotate in opposite directions; and because of the one tooth difference in gears 169 and 173 they rotate at slightly different speeds. Thus, the shaft 172 is rotated at a comparatively slow speed.

It will be noted that the shaft 172 drives the distance potentiometer 44 through gears 181 (FIG. 6) and that it drives the resolver 51 through gears 182. The gearing is such that the resolver rotor is rotated ten times for each single rotation of the potentiometer arm.

As previously explained, in the search mode the clutch control lead 128 (FIG. 1) is grounded so that the clutch is disengaged, the brake is on, and the DME is in fast servo drive; that is, the range motor 46 drives the range units 44 and 51 at the high speed. As soon as the range gate becomes coincident with the reply pulses and sufficient reply pulses pass through the range gate, the lead 128 is ungrounded so that the solenoid 167 is deenergized. The result is that the clutch is very quickly engaged by action of the spring 166 to put the DME in slow servo drive. Thus, the DME is in slow servo drive during the acquisition mode. It is also in slow servo drive during the track and proportional memory modes.

When, during search, the range gate becomes coincident with the reply pulses, it must be stopped very rapidly, i.e., switched very quickly to the slow drive so that there will be a lock-on for automatic track. During the search mode the range gate is being driven very rapidly, the gate travel rate being at forty miles per second or about 500 microseconds per second. The gate width of 34 microseconds is wide enough to allow three of four out of nine or ten successive reply pulses, for example, to pass through the range gate before it has time to move out of coincidence. Also, the system switches to slow servo drive fast enough so that the range gate is not driven out of coincidence with reply pulses before the system can lock on to the reply pulses. In the example described, the stopping time for the range servo, i.e., the time for shifting from fast servo drive to slow servo drive, is not greater than three milliseconds.

What is claimed is:

1. Distance measuring equipment (DME) comprising in combination, a range motor, a ranging unit, gear drive means having two different gear ratios either one of which may be selected to couple said motor to said ranging unit, a single servo channel which has its output coupled to said motor for driving it, means including mode switching means for applying either a range error signal or a range search signal to the input of said servo channel, means for selecting the other of said gear ratios for fast drive of said ranging unit while said range search signal is being applied to the input of said servo channel.

2. The invention according to claim 1 wherein the DME comprises means for transmitting interrogation pulses and means for receiving reply pulses in response to transmission of said interrogation pulses, and further comprises means for producing a range gate pulse that is shiftable in time with respect to an interrogation pulse, and wherein said mode switching means comprises means for automatically switching the DME into an automatic track-in-range mode in response to received reply pulses passing through said range gate, further comprises means for automatically switching the DME from the track-in-range mode to a memory mode in response to loss of reply pulses, further comprises means for automatically switching the DME from the memory mode to a search-in-range mode upon failure of reply pulses to return quickly enough to return the DME to the track-in-range mode, and further comprises means for automatically switching the DME from the search-in-range mode to an acquisition mode in response to the receipt of reply pulses that pass through said range gate, said DME switching to the track-in-range mode at the end of the acquisition mode period providing a sufficient number of received reply pulses pass through the range gate during the acquisition mode period.

3. The invention according to claim 2 where in the DME comprises means for transmitting interrogation pulses at a comparatively low pulse repetition frequency during the track-in-range mode, and means for transmitting said pulses at a comparatively high pulse repetition frequency during said search-in-range mode and during said acquisition mode.

4. The invention according to claim 3 wherein the DME comprises a pulse counter to which received reply pulses are applied, said counter including a capacitor which is step-charged by said reply pulses, said capacitor having a discharge circuit which has a certain time constant, the output of said pulse counter being connected to control, in part, said mode switching, and means for making said time constant comparatively long while the DME is transmitting interrogation pulses at said low pulse repetition frequency and for making said time constant comparatively short while the DME is transmitting interrogation pulses at said high pulse repetition frequency.

5. The invention according to claim 4 wherein the DME comprises a lag-lead network at the input end of said servo channel through which the range error, memory and search signals are applied to the input of said servo channel, and means for making the constants of said lag-lead network during the search and acquisition modes such that during these modes the servo has comparatively fast response, and means for making the constants of said lag-lead network during the track and memory modes such that during these modes the servo had comparatively slow response.

6. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a range motor, a ranging unit for controlling the timing of said range gate, gear drive means having two different gear ratios either one of which may be selected to couple said motor to said ranging unit, a single servo channel which has its output coupled to said motor for driving it, mode switching means for automatically switching the DME into an automatic track-in-range mode in response to received reply pulses passing through said range gate and including means for applying a range error signal to the input of said servo channel and including means for selecting a certain one of said gear ratios for slow drive of the ranging unit, mode switching means for automatically switching the DME from the track-in-range mode to a memory mode in response to loss of reply pulses with the DME still in slow servo drive of the ranging unit, mode switching means for automatically switching the DME from the memory mode to a search-in-range mode upon failure of reply pulses to return quickly enough to return the DME to the track-in-range mode and including means for applying a range search signal to the input of said servo channel and including means for selecting the other of said gear ratios for fast drive of said ranging unit, and mode switching means for automatically switching the DME from the search-in-range mode to an acquisition mode in response to the receipt of reply pulses that pass through said range gate and including means for applying a range error signal to the input of said servo channel and including means for selecting said certain one of said gear ratios for slow drive of the ranging unit, said DME switching to the track-in-range mode at the end of the acquisition mode period if a sufficient number of received reply pulses pass through the range gate during the acquisition mode period.

7. Distance measuring equipment (DME) comprising in combination, a range motor, means including a ranging unit for controlling the timing of a range gate, gear drive means having two different gear ratios either one of which may be selected to couple said motor to said ranging unit, said gear drive means comprising a clutch-brake unit of the type having an inner shaft and an outer coaxial shaft carrying a clutch plate, said inner shaft carrying a brake plate and a clutch plate, said inner shaft being movable axially to engage said clutch plates when moved in one direction and to brake said inner shaft when moved in the opposite direction, a differential having two input gears and an output shaft which is driven by the input gears when they are driven in opposite directions at different speeds, said range motor being coupled to drive one of said differential input gears and the outer shaft of said clutch-brake unit, the inner shaft of said clutch-brake unit being coupled to drive the other of said differential input gears in a direction opposite to that of said one differential input gear and at a different speed, the output shaft of said differential being coupled to drive said range unit, a single servo channel which has its output coupled to said motor for driving it, means including mode switching means for applying either a range error signal or a range search signal to the input of said servo channel, means for engaging said clutch plates and thereby selecting the gear ratio for slow drive of the ranging unit while said range error signal is being applied to the input of said servo channel, and means for braking said inner shaft and disengaging said clutch plates and thereby selecting the gear ratio for fast drive of said ranging unit while said range search signal is being applied to the input of said servo channel.

8. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a ranging unit for controlling the timing of said range gate, range driving means for selectively driving said ranging unit at either a comparatively high speed or at a comparatively low speed, mode switching means for automatically switching the DME into an automatic track-in-range mode in response to received reply pulses passing through said range gate and including means for selecting the low speed drive of the ranging unit and including means for causing interrogation pulse transmission to occur at a comparatively low pulse repetition frequency, mode switching means for automatically switching the DME from the track-in-range mode to a memory mode in response to loss of reply pulses with the DME still in low speed drive of the ranging unit, mode switching means for automatically switching the DME from the memory mode to a search-in-range mode upon failure of reply pulses to return quickly enough to return the DME to the track-in-range mode and including means for selecting the high speed drive of said ranging unit and including means for causing interrogation pulse transmission to occur at a comparatively high pulse repetition frequency, and mode switching means for automatically switching the DME from the search-in-range mode to an acquisition mode in response to the receipt of reply pulses that pass through said range gate and including means for selecting said low speed drive of the ranging unit and including means for maintaining the interrogation pulse transmission at a comparatively high pulse repetition frequency, said DME switching to the track-in-range mode at the end of the acquisition mode period if a sufficient number of received reply pulses pass through the range gate during the acquisition mode period.

9. The invention according to claim 8 wherein the DME comprises a pulse counter to which received reply pulses are applied, said counter including a capacitor which is step-charged by said reply pulses, said capacitor having a discharge circuit which has a certain time constant, the output of said pulse counter being connected to control, in part, the mode switching means, and means for making said time constant comparatively long while the DME is transmitting interrogation pulses at said low pulse repetition frequency and for making said time constant comparatively short while the DME is transmitting interrogation pulses at said high pulse repetition frequency.

10. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a range motor, a ranging unit for controlling the timing of said range gate, gear drive means having two different gear ratios either one of which may be selected to couple said motor to said ranging unit, a single servo channel which has its output coupled to said motor for driving it; mode switching means for automatically switching the DME into an automatic track-in-range mode in response to received reply pulses passing through said range gate and including means for applying a range error signal to the input of said servo channel and also including means for selecting a certain one of said gear ratios for slow drive of the ranging unit and also including means for causing interrogation pulse transmission to occur at a comparatively low pulse repetition frequency; mode switching means for automatically switching the DME from the track-in-range mode to a memory mode in response to loss of reply pulses with the DME still in slow servo drive of the ranging unit; mode switching means for automatically switching the DME from the memory mode to a search-in-range mode upon failure of reply pulses to return quickly enough to return the DME to the track-in-range mode and also including means for applying a range search signal to the input of said servo channel and also including means for selecting the other of said gear ratios for fast drive of said ranging unit and also including means for causing interrogation pulse transmission to occur at a comparatively high pulse repetition frequency; and mode switching means for automatically switching the DME from the search-in-range mode to an acquisition mode in response to the receipt of reply pulses that pass through said range gate and also including means for applying a range error signal to the input of said servo channel and also including means for selecting said certain one of said gear ratios for slow drive of the ranging unit and also including means for maintaining the interrogation pulse transmission at a comparatively high pulse repetition frequency, said DME switching to the track-in-range mode at the end of the acquisition mode period if a sufficient number of received reply pulses pass through the range gate during the acquisition mode period.

11. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a ranging unit for controlling the timing of said range gate, a range motor coupled to said ranging unit for driving it, a single servo channel which has its output coupled to said motor for driving it, mode switching means for automatically switching the DME into an automatic track-in-range mode in response to received reply pulses passing through said range gate and including means for applying a range error signal through a resistor of a lag-lead network to the input of said servo channel, a velocity memory capacitor connected to form part of said lag-lead network, said velocity memory capacitor being connected so that it is charged by the range error signal during said track-in-range mode while it is functioning as part of said lag-lead network for the servo during said track-in-range mode, mode switching means for automatically switching the DME from the track-in-range mode to a memory mode in response to loss of reply pulses, said switching to the memory mode disconnecting said range error signal from said servo channel input but keeping said velocity memory capacitor connected to the input of the servo channel to drive the range gate at its last velocity, mode switching means for automatically switching the DME from the memory mode to a search-in-range mode upon failure of reply pulses to return quickly enough to return the DME to the track-in-range mode and including means for making said velocity memory capacitor ineffective during said search-in-range mode, whereby the lag-lead network is effectively removed from the servo channel during said search-in-range mode, and further including means for applying a range search signal to the input of said servo channel.

12. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a ranging unit for controlling the timing of said range gate, a range motor coupled to said ranging unit for driving it, a single servo channel which has its output coupled to said motor for driving it, mode switching means for automatically switching the DME into an automatic track-in-range mode in response to received reply pulses passing through said range gate and including means for applying a range error signal through a resistor of a lag-lead network to the input of said servo channel, a velocity memory capacitor connected to form part of said lag-lead network, said velocity memory capacitor being connected so that it is charged by the range error signal during said track-in-range mode while it is functioning as part of said lag-lead network for the servo during said track-in-range mode, mode switching means for automatically switching the DME from the track-in-range mode to a memory mode in response to loss of reply pulses, said switching to the memory mode disconnecting said range error signal from said servo channel input but keeping said velocity memory capacitor connected to the input of the servo channel to drive the range gate at its last velocity, mode switching means for automatically switching the DME from the memory mode to a search-in-range mode upon failure of reply pulses to return quickly enough to return the DME to the track-in-range mode and including means for making said velocity memory capacitor ineffective during said search-in-range mode, whereby the lag-lead network is effectively removed from the servo channel during said search-in-range mode, and further including means for applying a range search signal to the input of said servo channel, and mode switching means for automatically switching the DME from the search-in-range mode to an acquisition mode in response to the receipt of reply pulses that pass through said range gate and including means for applying a range error signal to the input of said servo channel and further including means for maintaining said velocity memory capacitor ineffective during said acquisition mode whereby said lag-lead network is still effectively removed from the servo channel.

13. Distance measuring equipment (DME) comprising means for transmitting interrogation pulses and means for receiving reply pulses in response to transmission of said interrogation pulses, and further comprising means for producing a range gate pulse that is shiftable in time with respect to an interrogation pulse, a ranging unit for controlling the timing of said range gate, a range motor coupled to said ranging unit for driving it, a single servo channel which has its output coupled to said motor for driving it, mode switching means for automatically switching the DME into an automatic track-in-range mode in response to received reply pulses passing through said range gate and including means for applying a range error signal through a resistor to the input of said servo channel, a capacitor having one side connected through a second resistor to the servo channel end of said first resistor, the other side of said capacitor being connected to a switch which may be actuated either to connect said other side of said capacitor to ground or to short-circuit said capacitor, said other side of said capacitor being connected to ground during said track-in-range mode so that said capacitor is being charged during said track-in-range mode, and so that said capacitor and said resistors function as a lag-lead network for the servo during said track-in-range mode, mode switching means for automatically switching the DME from the track-in-range mode to a memory mode in response to loss of reply pulses, said switching to the memory mode disconnecting said range error signal from said servo channel input but keeping said other side of said capacitor connected to ground, mode switching means for automatically switching the DME from the memory mode to a search-in-range mode upon failure of reply pulses to return quickly enough to return the DME to the track-in-range mode and including means for actuating said switch to short-circuit said capacitor and for applying a range search signal to the input of said servo channel.

References Cited by the Examiner

UNITED STATES PATENTS

| | | | |
|---|---|---|---|
| 2,516,765 | 7/1950 | Ferrell | 343—13 X |
| 2,912,686 | 11/1959 | Dodington et al. | 343—7.3 |
| 2,996,707 | 8/1961 | Hirsch | 343—7.3 |
| 3,054,103 | 9/1962 | De Faymoreau | 343—13 |

CHESTER L. JUSTUS, *Primary Examiner.*